Sept. 11, 1951  A. F. HICKMAN  2,567,481
TANDEM AXLE SPRING SUSPENSION
Filed Nov. 2, 1949  5 Sheets-Sheet 1

INVENTOR
Albert F. Hickman
By
Popp and Popp
Attorneys

Patented Sept. 11, 1951

2,567,481

UNITED STATES PATENT OFFICE 2,567,481

TANDEM AXLE SPRING SUSPENSION

Albert F. Hickman, Eden, N. Y., assignor to Hickman Industries, Inc., Eden, N. Y., a corporation of New York Application November 2, 1949, Serial No. 124,961

8 Claims. (Cl. 280—104.5)

This invention relates to a tandem axle spring suspension particularly for trucks in which each axle is permitted to move against a geometric resilient resistance both laterally and longitudinally relative to the vehicle frame particularly where the vehicle has a high percentage of load variation.

The invention is particularly directed to the form of torsion rod tandem axle forming the subject of my Patent No. 2,333,650, dated November 7, 1943, and while it is more particularly described in connection with a truck, it is also applicable to other land vehicles such as railroad cars.

In common with the said patent important objects of the present invention are to provide a spring suspension (1) which will function to safely support the vehicle body at high speeds, both when loaded and unloaded; (2) which reduces and cushions both the vertical and lateral impacts from the axle against the body of the vehicle, both when the vehicle is loaded and unloaded and without imposing undue end thrusts on the pivotal connections which connect the axles to the body; (3) in which torsion rods are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which side sway is reduced to any desired amount; (7) in which periodic vibration of the suspension is damped out and in which wheel tramp is avoided; (8) in which all forces are cushioned so as to increase gasoline mileage and tire wear; (9) which has light unsprung weight, (10) in which the metal stresses are within safe working limits of heat treated castings or forgings; (11) which can be produced at low cost and in particular requires only simple machining operations; (12) in which the parts are arranged inside the wheels and in which the parts are arranged close to the wheels to provide high and wide pivot positions and increased stability; (13) which can easily be taken down and repaired; (14) in which any desired frequency or degree of spring deflection can be obtained; (15) in which auxiliary devices for the control of side sway are rendered unnecessary; (16) in which one or both of the tandem axles are self-steering so that when rounding a curve, said tandem axles are caused to assume such an angle relative to each other as will enable a pure rolling action to be obtained; (17) which includes compensating means connecting the companion ends of the tandem axles and through which the excess load on either axle is transmitted to the other axle; (18) in which said compensating means is in the form of a simple transmission arranged so that the excess stress on either torsion rod is transmitted to the other to transmit the load from one axle to the other; (19) in which the transfer of the load from the tandem axles to the front axle of the vehicle, under braking reaction, is identical with the similar transfer of the load in a two-axle vehicle of the same wheelbase, weight and load; (20) in which all connections to the frame are in closely spaced relation to each other thereby to reduce to a minimum any distortion of the suspension through weaving of the frame; (21) in which all connections to the frame are made to the longitudinal side bars thereof to simplify application of the suspension and design of the frame and suspension and to further reduce the effect of weaving of the frame upon the suspension; and (22) which will stand up under conditions of severe and constant use with very little servicing.

The principal specific object of the present invention is to provide such a tandem axle spring suspension which is particularly applicable to all types of trucks.

In particular a specific object is to provide such a tandem axle torsion spring suspension to fit a truck having a wide frame, and having large tires, it having been found difficult, with the suspension shown in the said patent to accommodate frames over thirty inches wide with 11 inch tires. Frames 34 inches wide with 11 inch tires must be arranged for and still have room for drive shaft.

Another specific object is to provide such a tandem axle torsion rod spring suspension which does not require the frame to be cut away at any highly stressed point to accommodate the suspension.

Another specific object is to provide such a tandem axle torsion rod spring suspension in which the truck frame can be arranged at a low elevation so that it can bottom on the axles. To accomplish this object it was necessary to arrange the torsion rods so that they were not interposed between the frame and the axles as in my said Patent No. 2,333,650.

Another specific object is to provide such a tandem axle torsion rod spring suspension having torsion rods of sufficient length to provide a proper ride and at the same time to provide axle compensation of at least 18 to 12 inches without cutting away a large section of the frame at a highly stressed point to accommodate the gear box necessary to such axle compensation.

Other specific objects and advantages will appear from the following description and accompanying drawings in which:

Fig. 1 is a fragmentary top plan view, partly in section, of a truck frame supported by a tandem axle spring suspension embodying my invention.

This invention is shown in connection with a highway truck, the frame 20 of which is shown as including a pair of main longitudinal side frame bars 21 of channel shape in cross section and arranged with their channels opposing each other. These side frame bars 21 of the frame are joined at their rear extremities by a cross frame bar 22 which is also shown as being channel shaped in cross section with its channel facing forwardly. For strength, diagonal brace channels 23 are preferably interposed between each side frame bar 21 and the central part of the rear cross frame bar 22 in any suitable manner. In addition the truck frame 20 is shown as including a pair of cross frame bars 24 arranged on opposite sides of the forward tandem axle and each of channel shape in cross section with its channel facing downwardly. Each end of each of these cross frame bars 24 is shown as secured to the web of the corresponding main longitudinal side frame bar 21 by a pair of L-shaped brackets 25 and between these cross frame bars 24 each main longitudinal side frame bar 21 is preferably reinforced by a top plate 26 welded along one side of the underside of the top flange of the main longitudinal side frame bar 21 and extending along the upper faces of the pair of cross frame bars 24 and welded thereto, these top plates 26 providing in effect an extension of the top flanges of the main longitudinal side frame bar 21 between the cross frame bars 24.

This frame is shown as supported by a pair of tandem axles 30 and 31 which are supported by wheels 32, these wheels being rotatably secured to the axles. One or both groups can be drive wheels, both axles being shown as provided for this purpose with differential housings 33, 34 through which power is transmitted to the drive axle shafts 35 housed within the axles 30, 31 and which are secured to the wheels 32 in the usual and well known manner.

The construction of the tandem axle spring suspension at the left hand side of the truck is the same as the tandem axle spring suspension at the right hand side of the truck and hence a description of the spring suspension at one side of the truck will be deemed to apply to both sides, the same reference numerals being used.

Referring more particularly to the front tandem axle 30, to each end of this axle is secured an axle bracket 36 which is fast to the axle and extends upwardly therefrom and is formed to provide a pair of arms or horns 37 which are spaced from each other lengthwise of the truck frame. Any suitable means can be provided for so securing each axle bracket 36 to the corresponding end of the front tandem axle 30, each axle bracket 36 being shown as having for this purpose a flat base 38 connected by four vertical bolts 39 to a bottom plate 40 arranged under the axle end. Filler blocks 41 and 42 are shown as interposed between the axle end and the flat base 38 and bottom plate 40, respectively, and can be welded to the axle end.

Figures 5, 6, 7, 8, 9, 10:
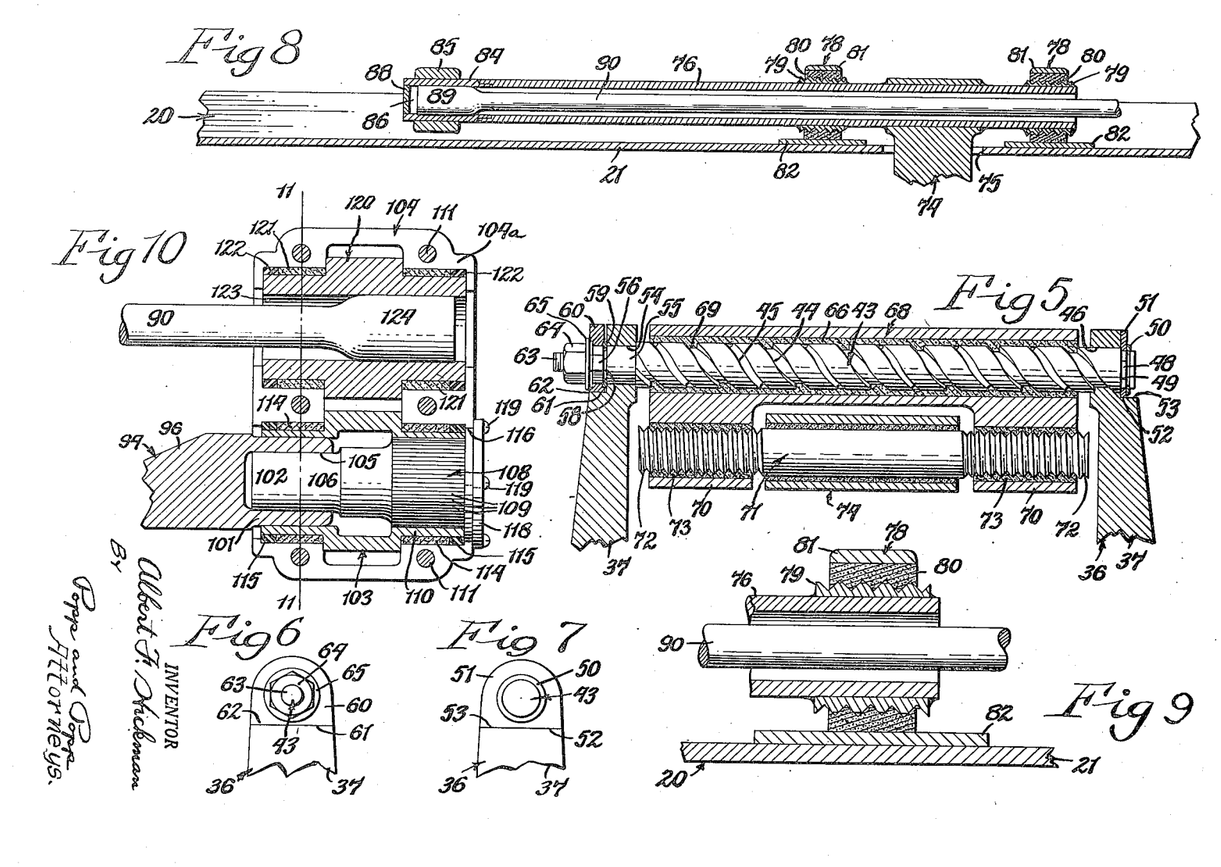
Fig. 5 is an enlarged fragmentary generally vertical section taken on line 5—5, Fig. 1.
Fig. 6 is a fragmentary end elevational view, viewed from the left hand of Fig. 5.
Fig. 7 is a fragmentary end elevational view, viewed from the right hand of Fig. 5.
Fig. 8 is a fragmentary horizontal section taken on line 8—8, Fig. 2.
Fig. 9 is an enlarged fragmentary view similar to Fig. 8 and showing one of the frame bearings.
Fig. 10 is an enlarged fragmentary vertical section taken on line 10—10, Fig. 1.

At their upper extremities the arms or horns 37 of each axle bracket 36 carry an axle pivot pin 43 which can be fastened to these arms or horns in any suitable manner, the details of the preferred connection between each axle pivot pin 43 and the horns or arms 37 of the corresponding axle bracket 36 being illustrated in detail in Figs. 5, 6 and 7.

As best shown in Fig. 5, the central part of this axle pivot pin 43 is enlarged as compared with its reduced ends and this enlarged cylindrical central part of each axle pivot pin 43 is provided with a large relatively deep helical groove 44 having a relatively long lead, this helical groove extending from one end of the cylindrical enlarged part of each axle pivot 43 to the opposite end thereof. This long lead helical groove 44 is responsible, as discussed later, for the self-steering character of the front tandem axle as achieved by the angular inclination of the pivot pins in the said Hickman patent, and for this purpose the axle pivot pins 43 at opposite sides of the truck are identical except that the helical grooves 44 are pitched in reverse relation to each other. Each axle pivot pin 43 can additionally be provided with a helical oil groove 45.

The connection between the rear end of each axle pivot pin 43 and the corresponding rear arm or horn 37 of the front axle bracket 36 is provided by a threaded bore 46 into which the long lead helical groove 44 of the axle pivot pin 43 screws and by a reduced hexagonal rear end 48 of the axle pivot pin 43 projecting rearwardly from the corresponding axle bracket arm or horn 37 and provided with an annular groove 49 for a snap ring 50. A washer like part 51 having a hexagonal hole fitting the hexagonal rear end 48 of the axle pivot pin 43 is interposed between the snap ring 50 and the adjacent flat vertical rear face provided at the upper end of the arm or horn 37. The lower edge 52 of this washer like part 51 is straight, as best shown in Fig. 7, and this straight edge seats upon a square shoulder 53 provided on the upper end of the rear arm or horn 37. It will therefore be seen that each washer like part 51 tends to hold the rear end of the axle pivot pin 43 against turning.

The connection between the front end of each axle pivot pin 43 and the corresponding front arm or horn 37 of the axle bracket 36 comprises a bore 54 provided in this arm or horn 37 and receiving a cylindrical reduced end 55 provided at the corresponding end of the pin 43. Beyond the reduced end 55 the pin 43 is formed to provide a hex 56 or other out of round cross sectional shape, and between this hex 56 and the reduced part 55 the pin 43 is formed to provide a groove 58 receiving a snap ring 59. The hex 56 fits in a hexagonal opening provided in a washer-like part 60, one side 61 of which is straight or square to fit a square shoulder 62 provided on the adjacent arm or horn 37. It will be seen that this washer-like part 60 is prevented from turning relative to its axle bracket arm 37 and since it is provided with a hexagonal opening fitting the hex 56 provided on the front end of the pin 43, the pin 43 is likewise prevented from turning relative to the axle bracket arm 37. To retain the pin 43 against endwise displacement, its further reduced end 63 is threaded to receive a nut 64, a washer 65 being interposed between this nut and the washer-like part 60. Since the hex 56 is smaller than the bores 54 and 46, it will be seen that the pin 43 can readily be removed by removing its nut 64 and withdrawing the pin 43 axially to the right as viewed in Fig. 5.

Each axle pivot pin 43 is journalled in a bearing bushing 66 in the upper end of a shackle 68. This bearing bushing 66 is preferably made of a lubricant impregnated material and this bearing bushing 66 is provided with a thread 69 to fit the long lead groove 44 provided in the axle pivot pin 43. Each shackle 68 can be of any suitable construction and is formed to provide a pair of depending arms or knuckles 70 in which opposite ends of a crank arm pivot pin 71 are journalled in any suitable manner, each crank arm pivot pin 71 being arranged parallel with its companion axle pivot pin 43. As best shown in Fig. 5 it is preferred to thread the opposite ends 72 of each crank arm pivot pin 71 and to fit each of these threaded ends into a threaded bearing bushing 73 provided in the corresponding arm or knuckle 70 of the shackle. Each bushing 73 is preferably made of a lubricant impregnated material and it will be seen that such bushings permit oscillation of the shackle 68 and at the same time prevent substantial endwise movement of the shackle relative to the crank arm pivot pin so as to resist end thrust caused by brake and drive torque reactions against the shackles 68.

Figure 3:
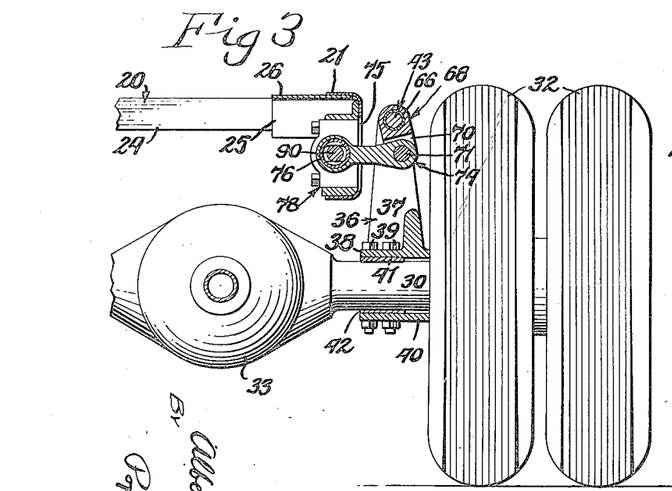
Figs. 3 and 4 are fragmentary vertical transverse sectional views taken on the correspondingly numbered lines of Fig. 1.

Each crank arm pivot pin 71 is fast to the outer or free end of a crank arm 74 which outer or free end is disposed between the arms or knuckles 70 of the corresponding shackle 68. Each crank arm 74 extends through an opening 75 in the vertical web of the adjacent longitudinal side frame bar 21 and its opposite or inner end embraces and is secured to, as by welding, a tube 76 as best shown in Figs. 3 and 8.

This tube 76 is arranged within the channel of its longitudinal side frame bar 21 and extends along this longitudinal side frame bar 21 parallel with the axle pivot pin 43 and crank arm pivot pin 71. On opposite sides of the crank arm 74, the tube 76 is journalled in a pair of bearings indicated generally at 78 and which are identical in construction.

Each of these bearings can be of any suitable construction to permit oscillation of the tube 76 and at the same time resist end thrust thereof and for this purpose these bearings are shown as being of the threaded bushing type, illustrated in larger section in Fig. 9. As there shown, each bearing 78 comprises an externally threaded metal sleeve 79 fitting around and welded to the tube 76 and the threads of which fit in an internally threaded bushing 80 preferably made of a lubricant impregnated bearing material. This threaded bushing is held in a metal holder or case 81 having a flat base 82 which can be secured in any suitable manner to the inner face of the web of the corresponding longitudinal side frame bar 21. It will be seen that the externally threaded sleeve 79 is free to turn in the internally threaded lubricant impregnated bushing 80 and is held against endwise displacement by the threads. The oscillation of the threaded sleeve 79 in the threaded bushing 80 results, of course, in a slight endwise movement of the threaded sleeve 79 and tube 76, but this slight movement is of no consequence in the suspension.

Each tube 76 extends forwardly a substantial distance from its front bearing 78 and at its extreme forward end has welded thereto a socket member 84 as best shown in Fig. 8. This socket member is preferably reinforced by a surrounding ring 85 and is provided with a bore 86 the end of which can be closed by a plug 88. This bore 86 is preferably oval in cross section to receive the enlarged ovalled live end 89 of a torsion rod 90. The oval bore 86 and ovalled live end 89 are preferably formed in the manner set forth in my Patent No. 2,213,004, granted August 27, 1940, for Torsion Rod Mounting.

Referring now to the rear tandem axle 31 the spring suspension from each end of this axle to its crank arm is identical with the corresponding parts of the front tandem axle suspension and the same reference numerals have therefore been applied and distinguished by the suffix "a." Thus, to each end of this rear axle is secured an axle bracket 36a which is fast to the axle and extends upwardly therefrom and is formed to provide a pair of arms or horns 37a which are spaced from each other lengthwise of the truck frame. Any suitable means can be provided for so securing each axle bracket 36a to the corresponding end of tandem axle 31, each axle bracket being shown as having for this purpose a flat base 38a connected by four vertical bolts 39a to a bottom plate 40a arranged under each axle end. Filler blocks 41a and 42a are shown as interposed between the axle end and the flat base 38a and bottom plate 40a, respectively, and can be welded to the axle end.

Figure 13:
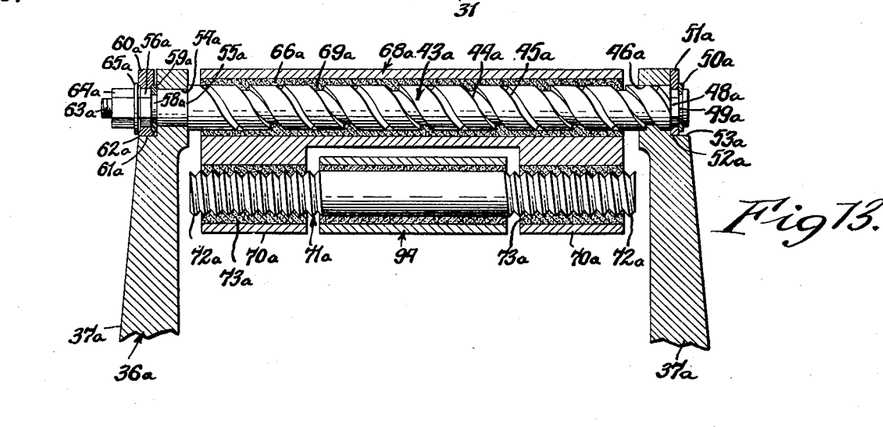
Fig. 13 is an enlarged generally vertical section taken on line 13—13, Fig. 1.

At their upper extremities, the arms or horns 37a of each axle bracket 36a carries an axle pivot pin 43a which can be fastened to these arms or horns in any suitable manner, the details of the preferred connection between each axle pivot pin 43a and the horns or arms 37a of the corresponding axle bracket 36a being illustrated in detail in Fig. 13.

As best shown in this figure the central part of this axle pivot pin 43a is enlarged as compared with its reduced ends and this enlarged cylindrical central part of each axle pivot pin 43a is provided with a large relatively deep helical groove 44a having a relatively long lead, this helical groove extending from one end of the cylindrical enlarged central part of each axle pivot pin 43a to the opposite end thereof. This long lead helical groove 44a is responsible, as discussed later, for the self-steering character of the rear tandem axle as achieved by the angular inclination of the pivot pins in my Patent No. 2,333,650 and for this purpose the axle pivot pins 43a at opposite sides of the truck are identical except that the helical grooves 44a are pitched in reverse relation to each other.

The connection between the rear end of each axle pivot pin 43a and the corresponding rear arm or horn 37a of the axle bracket 36a is provided by a threaded bore 46a into which the long lead helical groove 44a of the axle pivot pin 43a screws and by a reduced hexagonal rear end 48a of the axle pivot pin 43a projecting rearwardly from the corresponding axle bracket arm or horn 37a and provided with an annular groove 49a for a snap ring 50a. A washer-like part 51a having a hexagonal hole fitting the hexagonal rear end 48a of the axle pivot pin 43a is interposed between the snap ring 50a and the adjacent flat vertical rear face provided at the upper end of the arm or horn 37a. The lower edge 52a of this washer 51a is straight in the same manner as with the corresponding washer 51 for the front axle pivot pin 43 and this straight edge seats upon a square shoulder 53a provided on the upper end of the rear axle bracket arm 37a. It will be seen that the resting of the straight edge 52a of the washer member 51a on the shoulder 53a and the hexagonal hole in this washer member fitting the hexagonal end 48a of the axle pivot pin 43a holds this end of this axle pivot pin against turning relative to this axle bracket arm.

As with the front axle bracket 36, the connection between the front end of each axle pivot pin 43a and the corresponding front arm or horn 37a of the axle bracket 36a comprises a bore 54a provided in this arm or horn 37a and receiving a cylindrical reduced end 55a provided at the corresponding end of the pin 43a. Beyond the reduced end 55a the pin 43a is formed to provide a hex 56a or other out of round cross sectional shape, and between this hex 56a and the reduced part 55a the pin 43a is formed to provide a groove 58a receiving a snap ring 59a. The hex 56a fits in a hexagonal opening provided in a washer-like part 60a, one side 61a of which is straight or squared to fit a square shoulder 62a provided on the adjacent arm or born 37a, in the same manner as with the corresponding washer-like part 60 of each front axle pivot pin 43. It will be seen that this washer-like part 60a is prevented from turning relative to its axle bracket arm 37a and since it is provided with a hexagonal opening fitting the hex 56a provided on the front end of the pin 43a, the pin 43a is likewise prevented from turning relative to the axle bracket arm 37a. To retain the pin 43a against endwise displacement, its further reduced end 63a is threaded to receive a nut 64a, a washer 65a being interposed between this nut and the washer like part 60a. Since the hex 56a is smaller than the bores 54a and 46a, it will be seen that the pin 43a can readily be removed by removing its nut 64a and withdrawing the pin 43a axially to the right as viewed in Fig. 13.

As with the front axle assembly, each axle pivot pin 43a is journalled in a bearing bushing 66a in the upper end of a shackle 68a. This bearing bushing 66a is preferably made of a lubricant impregnated material and this bearing bushing 66a is provided with a thread 69a to fit the long lead groove 44a provided in the axle pivot pin 43a. Each shackle 68a can be of any suitable construction and is formed to provide a pair of depending arms or knuckles 70a in which opposite ends of a crank arm pivot pin 71a are journalled in any suitable manner, each crank arm pivot pin 71a being arranged parallel with its companion axle pivot pin 43a. As best shown in Fig. 13, it is preferred to thread the opposite ends 72a of each crank arm pivot pin 71a and to fit each of these threaded ends into a threaded bushing 73a provided in the corresponding arm or knuckle 70a of the shackle. Each bushing 73a is preferably made of a lubricant impregnated material and it will be seen that such bushings permit oscillation of the shackle 68a and at the same time prevent substantial endwise movement of the shackle relative to the crank arm pivot pin so as to resist end thrust caused by brake and drive torque reactions against the shackles 68a.

Figure 4:
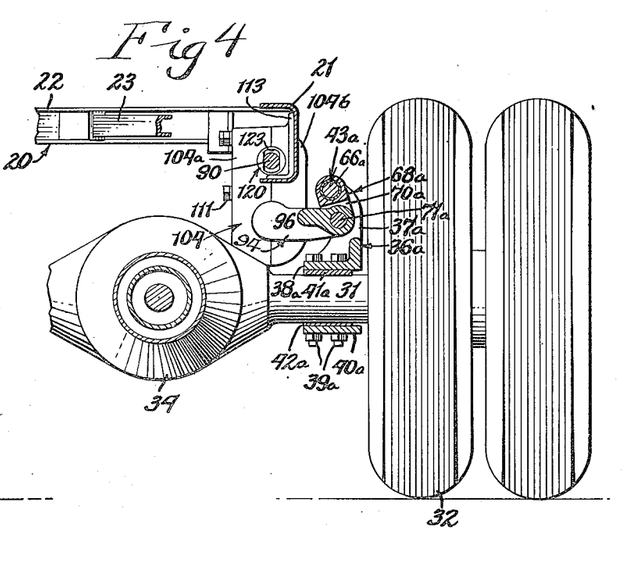

Each crank arm pivot pin 71a is fast to the outer or free end of a crank arm 94 which outer or free end is disposed between the arms or knuckles 70a of the corresponding shackle 68a. Each crank arm 94 is disposed below the adjacent longitudinal side frame bar 21 as best shown in Fig. 4, and is bifurcated to form a pair of fulcrum arms 95 and 96. The forward fulcrum arm 95 of each crank arm is formed to provide a forward crank arm pivot pin 98 and which is journalled in a bearing 99. This bearing 99 can be of any suitable construction and is secured to the adjacent longitudinal side frame bar 21, each of the bearings 99 being shown as provided for this purpose with an upwardly extending plate 100 which can be welded or otherwise secured to the outer face of this longitudinal side frame bar 21.

Figures 11, 12:
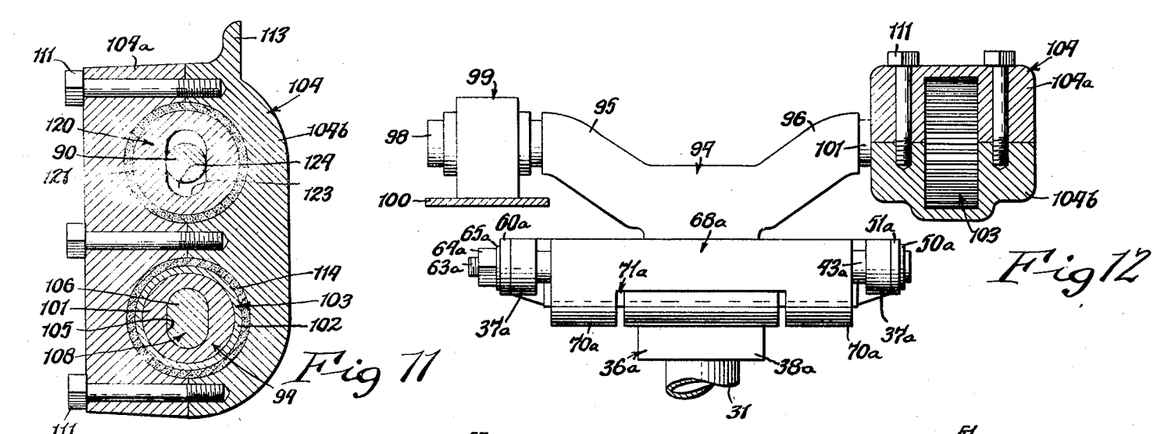
Fig. 11 is a vertical section taken on line 11—11, Fig. 10.
Fig. 12 is an enlarged horizontal section taken generally on line 12—12, Fig. 2.

The rear fulcrum arm 96 of each crank arm 94 is formed to provide a cylindrical hub or extension 101 fitted, as best shown in Figs. 10 and 11, in a bore at the rear end of the hub 102 of a gear 103 journalled in a gear box 104. This hub or cylindrical extension 101 of each crank arm 96 is also provided with an oval end socket 105 in which is fitted the ovalled end 106 of a splined member 108, the opposite end of which is enlarged and provided with splined grooves 109 fitted in the opposite end 110 of the hub of the gear 103, this end 110 of the hub of the gear 103 being splined so that the gear 103 is compelled to turn with the splined member 108, this splined member in turn being compelled to turn with the corresponding crank arm 94.

Figure 2:
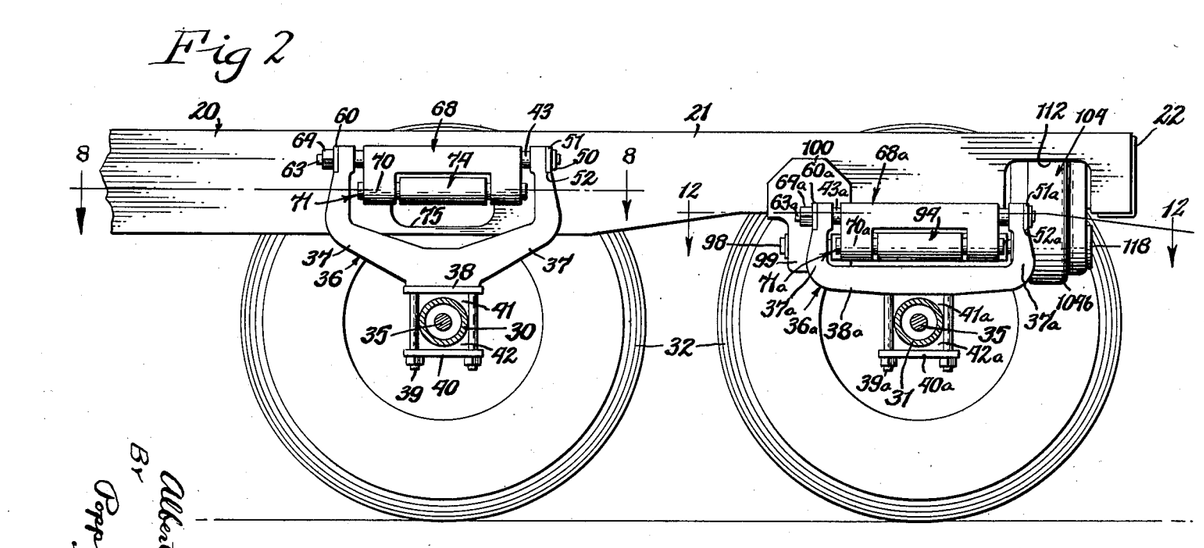
Fig. 2 is a vertical longitudinal section thereof, taken on line 2—2, Fig. 1.

The gear case 104 is split to provide an inner section 104a and an outer section 104b, these two sections being connected by screws 111 and each longitudinal side frame bar 21 being cut away, as indicated at 112, to accommodate the upper part of the outer section 104b of the gear box, as best shown in Fig. 2. This outer section 104b of the gear box can be secured to the adjacent longitudinal side frame bar 21 in any suitable manner as by the provision of a flange 113 thereon which fits inside the longitudinal side frame bar 21 around the opening 112 and can be secured thereto in any suitable manner. It will particularly be noted that the longitudinal side frame bars 21 are cut at their extreme rear ends to provide the openings 112 for accommodating the gear box 104, these longitudinal side frame bars 21 not being highly stressed at this point.

The hub ends of the gear 103 are journalled in bearings 114 arranged in bores jointly provided by the two sections of the gear box 104, these bearings preferably being of a lubricant impregnated material. Each of these bearings 114 is also preferably protected by a dust seal in the form of a rubber ring 115 at the outer end thereof. To permit of ready dismantling of the suspension the two sections of the gear box 104 are formed to provide an opening 116 in line with the splined member 108 and of a sufficiently large size to permit the splined member 108 to be directly drawn rearwardly through this opening. To prevent accidental displacement of the splined member 108, this opening 116 is provided with a flanged plug 118 which can be secured to the gear case 104 by screws 119 or in any other suitable manner.

The teeth of the gear 103 mesh with the teeth of a gear 120, this last gear being provided with extended hubs journalled in bearings 121 carried between the two sections 104a, 104b of the gear case 104 in the same manner as with the bearings 114 of the gear 103. These bearings 121 are also preferably made of a lubricant impregnated material and are preferably protected by dust seals in the form of rubber rings 122 at the outer ends of these bearings.

Each gear 120 is formed to provide a through bore 123 which is oval in cross section, this oval bore 123 receiving an enlarged ovalled rear end 124 of the torsion rod 90. As with the opposite end 89 of this torsion rod 90, the oval bore 123 and ovalled end 124 of the torsion rod are preferably formed in the manner set forth in my Patent 2,213,004, granted August 27, 1940, for Torsion Rod Mounting.

In the operation of the suspension the upward movement of one end of, say, the front axle 30, through its shackle 68, swings the outer end of its crank arm 74 upwardly. This rotates the tube 76, to which this crank arm is fixed, in its bearings 78 on the adjacent longitudinal side frame bar 21. Since the forward enlarged ovalled extremity 89 of the torsion rod 90 is connected through the oval bore socket member 84 with this torsion tube 76, this rotation of the torsion tube imparts a twisting or torsional movement to this live end 89 of the torsion rod 90.

This torque of the torsion rod 90 is transmitted through its ovalled end 124 and ovalled bore 123 to the upper gear 120. This gear 120 is thereby rotated and rotates its companion gear 103 in the gear box 104. The rotation of the gear 103 rotates the member 108 splined therein and through the ovalled end 106 of this splined member 108 rotates the rear crank arm 94 about its fulcrum pivots 98 and 101.

Because of the gears 103 and 120, this twisting of the torsion rod 90 tends to force the rear crank arm 94 downwardly. This downward force imposed upon the crank arm 94 for the rear axle is transmitted through its shackle 68a directly to the corresponding end of the rear axle 31.

It will therefore be seen that the torsion rod 90 connected through the tube 76, crank arm 74 and shackle 68 to the corresponding end of the front axle 30 and also connected through the gears 120 and 103 to the crank arm 94 and shackle 68a for the rear axle 31, provides axle compensation, that is, the transfer of the load from one of the tandem axles to the other, thereby to secure a distribution of the load between the tandem axles. At the same time the torsion rod 90 is of sufficient length to provide the necessary resiliency between the tandem axles 30, 31 and the frame 20 of the truck.

It will be seen that the shackles 68 and 68a are inclined upwardly and inwardly from their respective crank arm pivots 71, 71a to the corresponding axle pivot pins 43, 43a. This upward and inward inclined arrangement of the shackles tends to cause each axle to centralize itself in a direction transverse of the frame and enables the action of gravity to geometrically and resiliently resist any movement of either axle away from its central position. This permits the vehicle frame 20 to move substantially straight ahead despite a certian amount of lateral movement of the axles. This arrangement of the shackles further provides high and wide pivot positions which provide increased stability in that these high and wide pivot positions provide effective spring centers which can be as wide or wider than the track of the vehicle. Further, this arrangement reduces side sway, the high and wide pivot positions, together with the upward and inward slant of the shackles, providing a suspension in which the frame 20 is more nearly suspended than mounted. Other important advantages which flow from the inclined arrangement of the shackles as shown are the reduction in the possibility of wheel tramp and in the elimination of the need for antibody roll devices, such as torsion bar stabilizers.

When the vehicle is traveling straight ahead, if the tandem axles 30, 31 are not parallel for any reason, they will automatically assume a parallel position because of the fact that if, for example, the rear axle 31 is out of line, it will tend to follow a horizontal arc and this tendency, due to the lateral friction between the tires and the roadway, will cause a lateral movement of the axle relative to the frame. Due to the fact that the shackles 68 and 68a normally extend upwardly and inwardly, this lateral movement is automatically caused to be translated into a slight turning movement, in a horizontal plane, of the whole axle, and this turning movement will continue until both the tandem axles are in line with each other. Such a movement, naturally, causes a change in the angularity of the shackles 68 or 68a at the opposite end of each axle and this change is resisted by gravity which, due to the obliquity of the shackles, is caused to act in a geometric manner.

This tendency of the axles 30 and 31 to "trail" each other also occurs when the axle is making a turn on the road. In this case, just as when going straight ahead, the tires naturally tend to resist lateral scuffing and in doing so tend to push each axle laterally, and, as a consequence, each axle moves axially to eliminate this scuffing. Confining our attention to, say, the front tandem axle 30, this lateral or axial movement of the axle in resisting tire scuff on making a turn causes the shackles 68 at its opposite ends to swing about the axle pivot pins 43 in a corresponding direction, that is, one shackle 68 will swing out and the other shackle will swing in, but both will rotate in the same angular direction. Since the axle pivot pins 43 are provided with the long lead spiral grooves 44 and since the bearing bushings 66 for these axle pivot pins are provided with the long lead spiral threads 69 fitting these grooves, and since the bearing bushings 66 are held against endwise displacement relative to the shackles 68, crank arms 74 and vehicle frame 20, it will be seen that such rotation or oscillation of the shackles 68 relative to the axle pivot pins 43 will cause endwise displacement of the axle pivot pins 43. Since the axle pivot pins 43 are held against endwise displacement relative to the axle 30, it will be seen that such endwise displacement of the axle pivot pins 43 will cause a fore-and-aft displacement of the corresponding end of the axle 30 relative to the frame 20. The grooves 44 in the axle pivot pin 43 at one end of the axle 30 spiral in the opposite direction from the grooves 44 in the axle pivot pin 43 at the opposite end of the axle. Accordingly, on rounding a curve and with such endwise movement of the axle 30 causing its shackles 68 to swing relative to its axle pivot pins 43, one end of the axle 30 is moved rearwardly, relative to the vehicle frame 20, by the spiral groove 44 in the adjacent axle pivot pin 43 while the opposite end of the axle 30 is moved forwardly, relative to the vehicle frame 20, by the spiral groove 44 in the other axle pivot pin 43. The spiral grooves 44 are, of course, arranged to spiral in that direction to cause the axle 30 to steer in the direction to correspond to the turn being made by the truck. That is, these grooves 44 spiral in the direction, as shown, such that when making, say, a left hand turn, the spiral groove 44 in the left hand axle pivot pin 43 will cause a rearward movement, relative to the vehicle frame 20, of the left hand end of the axle 30 whereas the spiral grooves 44 in the right hand axle pivot pin 43 will cause a forward movement, relative to the vehicle frame 20, of the right hand end of the axle 30.

This description of the self-steering action of the front tandem axle 30 caused by its helically grooved or threaded axle pivot pins 43 applies also to the rear axle 31 which is similarly provided with a pair of helically grooved axle pivot pins 43a. With both the front and rear axles the pitch of the helical grooves on the axle pivot pins is such as to cause at least 3/8 inch movement of each axle end lengthwise of the truck frame in response to a 60°–70° movement of the corresponding shackle. With such helically grooved axle pivot pins, when the truck is making a turn, the tandem axles can be caused to automatically move to such oblique position relative to each other as will cause their axes to intersect the axes of rotation of the two front or steering wheels of the truck and thereby enable the truck to make the turn without tire scuffing. This action occurs when either the vehicle is steered around a long turn in the road or when it is steered sharply on a straight road, as for instance, when overtaking a slow vehicle ahead, or otherwise avoiding some obstruction. It will also be seen that this action takes place to some extent when a tendency to tire scuffing occurs because one wheel or a pair of wheels having a diameter different from the diameter of the wheel or pair of wheels at the other end of the same axle.

In achieving such self-steering of the tandem axles, it is only necessary to thread or helically groove the four axle pivot pins 43 and 43a. The other pins, namely the crank arm pivot pins and the pins supporting the crank arms can be of conventional form, threaded bushings being preferred for these pins merely in the interest of economy, the action of the threads having no effect in steering the axles.

It will be noted that with the suspension as shown, the torsion rods 90 and tubes 76 are disposed within the frame 20 and in particular are not arranged between the frame and the axles. This renders it unnecessary to raise the frame to accommodate the suspension and hence permits the truck to be made with a lower frame than was possible with the construction shown in my Patent No. 2,333,650. This is an important feature of the invention since low as well as wide truck bodies are in increasing demand.

It will be further noted that while the openings 75 in the longitudinal side frame bars 21 are provided at a point where the frame is highly stressed in order to accommodate the forward crank arms 74, these openings are relatively small and are in the web of these longitudinal side frame bars and leave the upper and lower flanges thereof intact. Further, at this point the longitudinal side frame bars 21 can be readily reinforced as by the top plates 26 shown. The recess 112 for the gear box 104 is larger than the opening 75 and also cuts through the lower flange of each longitudinal side frame bar 21. However, these recesses 112 are at the extreme rear of the frame where the frame is not highly stressed.

From the foregoing it will be seen that the invention is particularly applicable to trucks having low and wide frames and large tires and achieves the stated objects in a simple and inexpensive construction.

I claim:

1. A tandem axle vehicle spring suspension adapted to be interposed between a vehicle frame having a longitudinal side bar at one side and a pair of tandem axles each having wheels journalled thereon, comprising a pair of coaxial bearings secured directly to the inner side of said longitudinal side bar on opposite sides of the front tandem axle, a tube journalled in said bearings to extend lengthwise of said longitudinal side bar along the inner side and above the lower edge thereof, means operatively connecting said tube intermediate said bearings with the corresponding end of said front tandem axle, a torsion rod in said tube, means securing the front end of said torsion rod to the front end of said tube, said torsion rod extending rearwardly to a position beyond the rear tandem axle, a gear box secured to said longitudinal side bar in rear of said rear tandem axle, a pair of intermeshing gears journalled in said gear box one above the other to rotate about parallel axes and with the upper gear arranged generally coaxial with said pair of bearings, means securing the rear end of said torsion rod to said upper gear, and means operatively connecting said lower gear with the corresponding end of said rear tandem axle.

2. A tandem axle vehicle spring suspension adapted to be interposed between a vehicle frame having a longitudinal side bar at one side and a pair of tandem axles each having wheels journalled thereon, comprising a bearing secured to the inner side of said longitudinal side bar adjacent the front tandem axle, a torsion rod having its front end journalled in said bearing and arranged parallel with and above the lower edge of said longitudinal side bar, means operatively connecting the front end of said torsion rod with the corresponding end of said front tandem axle, said torsion rod extending rearwardly to a position beyond the rear tandem axle, a gear box secured to said longitudinal side bar in rear of said rear tandem axle, a pair of intermeshing gears journalled in said gear box one above the other to rotate about parallel axes and with the upper gear arranged generally coaxially with said bearing, means securing the rear end of said torsion rod to said upper gear, and means operatively connecting said lower gear with the corresponding end of said rear tandem axle.

3. A tandem axle vehicle spring suspension adapted to be interposed between a vehicle frame having a longitudinal side bar at one side and a pair of tandem axles each having wheels journalled thereon, comprising a pair of bearings secured to said longitudinal side bar and disposed coaxially along the inner side thereof, a crank arm journalled in said bearings and extending horizontally through an opening provided in said longitudinal side bar intermediate said bearings, a shackle connecting the free end of said crank arm with the corresponding end of the front tandem axle, a torsion rod secured to said crank arm to extend rearwardly therefrom generally coaxially with its fulcrum axis and arranged above the lower edge of said longitudinal side bar, and means operatively connecting the rear end of said torsion rod with the corresponding end of the rear tandem axle.

4. A tandem axle vehicle spring suspension adapted to be interposed between a vehicle frame having a longitudinal side bar at one side and a pair of tandem axles each having wheels journalled thereon, comprising a pair of bearings secured to said longitudinal side bar and disposed coaxially along the inner side thereof, a tube journalled in said bearings to extend lengthwise of said longitudinal side bar along the inner side and above the lower edge thereof, a crank arm fast to said tube intermediate said bearings and extending horizontally through an opening provided in said longitudinal side bar, a shackle connecting the free end of said crank arm with the corresponding end of the front tandem axle, a torsion rod secured to said crank arm to extend rearwardly therefrom generally coaxially with its fulcrum axis and arranged above the lower edge of said longitudinal side bar, and means operatively connecting the rear end of said torsion rod with the corresponding end of the rear tandem axle.

5. A tandem axle vehicle spring suspension adapted to be interposed between a vehicle frame having a longitudinal side bar at one side and a pair of tandem axles each having wheels journalled thereon, comprising a pair of bearings secured to said longitudinal side bar and disposed coaxially along the inner side thereof, a crank arm journalled in said bearings and extending horizontally through an opening provided in said longitudinal side bar intermediate said bearings, a shackle connecting the free end of said crank arm with the corresponding end of the front tandem axle, a torsion rod secured to said crank arm to extend rearwardly therefrom generally coaxially with its fulcrum axis and arranged above the lower edge of said longitudinal side bar, a gear box secured to said longitudinal side bar in rear of said rear tandem axle and projecting into a recess provided in said longitudinal side bar, a pair of intermeshing gears journalled in said gear box one above the other to rotate about parallel axes and with the upper gear arranged generally coaxial with said pair of bearings, means securing the rear end of said torsion rod to said upper gear, and means operatively connecting said lower gear with the corresponding end of said rear tandem axle.

6. A tandem axle vehicle spring suspension adapted to be interposed between a vehicle frame having a longitudinal side bar at one side and a pair of tandem axles each having wheels journalled thereon, comprising a pair of bearings secured to said longitudinal side bar and disposed coaxially along the inner side thereof, a crank arm journalled in said bearings and extending horizontally through an opening provided in said longitudinal side bar intermediate said bearings, a shackle connecting the free end of said crank arm with the corresponding end of the front tandem axle, a torsion rod secured to said crank arm to extend rearwardly therefrom generally coaxially with its fulcrum axis and arranged above the lower edge of said longitudinal side bar, a gear box secured to said longitudinal side bar in rear of said rear tandem axle and projecting into a recess provided in said longitudinal side bar, a pair of intermeshing gears journalled in said gear box one above the other to rotate about parallel axes and with the upper gear arranged generally coaxial with said pair of bearings, means securing the rear end of said torsion rod to said upper gear, a second crank arm arranged generally horizontally above said rear tandem axle, a bearing on said longitudinal side bar in front of said rear tandem axle generally coaxial with said lower gear and in which the forward end of said second crank arm is fulcrumed, means securing the rear end of the fulcrum of said second crank arm to said lower gear, and a shackle connecting the free end of said second crank arm with the corresponding end of said rear tandem axle.

7. A tandem axle vehicle spring suspension adapted to be interposed between a vehicle frame having a longitudinal side bar at one side and a pair of tandem axles each having wheels journalled thereon, comprising a crank arm fulcrumed on said longitudinal side bar above the front tandem axle to swing about a generally horizontal axis parallel with said longitudinal side bar, said crank arm projecting outwardly from said longitudinal side bar, a shackle pivotally connecting the outer free end of said crank arm with the corresponding end of said front tandem axle, a gear box secured to said longitudinal side bar in rear of the rear tandem axle, a pair of intermeshing gears journalled in said gear box one above the other to rotate about parallel axes and with the upper gear arranged generally coaxial with the fulcrum axis of said crank arm, a torsion rod connected at its front end with the fulcrum of said crank arm and at its rear end with said upper gear, a second crank arm arranged generally horizontally above said rear tandem axle, a bearing on said longitudinal side bar in front of said rear tandem axle generally coaxial with said lower gear and in which the forward end of said second crank arm is fulcrumed, means securing the rear end of the fulcrum of said second crank shaft to said lower gear, and a shackle connecting the free end of said second crank arm with the corresponding end of said rear tandem axle.

8. A tandem axle vehicle spring suspension adapted to be interposed between a vehicle frame having a longitudinal side bar at one side and a pair of tandem axles each having wheels journalled thereon, comprising a crank arm fulcrumed on said longitudinal side bar above the front tandem axle to swing about a generally horizontal axis parallel with said longitudinal side bar, said crank arm projecting outwardly from said longitudinal side bar, a shackle pivotally connecting the outer free end of said crank arm with the corresponding end of said front tandem axle, a gear box secured to said longitudinal side bar in rear of the rear tandem axle, a pair of intermeshing gears journalled in said gear box one above the other to rotate about parallel axes and with the upper gear arranged generally coaxial with the fulcrum axis of said crank arm, a torsion rod connected at its front end with the fulcrum of said crank arm and at its rear end with said upper gear, a second crank arm arranged generally horizontally above said rear tandem axle, a bearing on said longitudinal side bar in front of said rear tandem axle generally coaxial with said lower gear and in which the forward end of said second crank arm is fulcrumed, the rear end of said second crank arm being formed to provide a fulcrum hub projecting into the front end of a through bore in said lower gear and being provided with an out of round end socket, a spline member fitted into said bore from the rear end thereof and having a forward out of round projection fitting said out of round socket in said crank arm and having its rear end splined to said lower gear, and a shackle connecting the free end of said second crank arm with the corresponding end of said rear tandem axle.

ALBERT F. HICKMAN.

REFERENCES CITED

The following references are of record in the file of this patent:

UNITED STATES PATENTS

| Number | Name | Date |
|---|---|---|
| 1,396,549 | Beatty | Nov. 8, 1921 |
| 2,099,819 | Mercier | Nov. 23, 1937 |
| 2,428,160 | Holmstrom et al. | Sept. 30, 1947 |